No. 786,904. PATENTED APR. 11, 1905.
J. W. HYATT.
LINK FOR PERMEABLE CHAINS.
APPLICATION FILED JULY 17, 1903. RENEWED SEPT. 10, 1904.

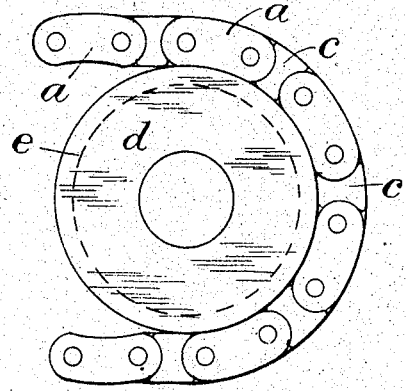

Attest:
L. Lee
D. Blake
Inventor.
John W. Hyatt, per
Thomas S. Crane, Atty.

No. 786,904.

Patented April 11, 1905.

UNITED STATES PATENT OFFICE.

JOHN W. HYATT, OF NEWARK, NEW JERSEY.

LINK FOR PERMEABLE CHAINS.

SPECIFICATION forming part of Letters Patent No. 786,904, dated April 11, 1905.

Application filed July 17, 1903. Renewed September 10, 1904. Serial No. 224,027.

*To all whom it may concern:*

Be it known that I, JOHN W. HYATT, a citizen of the United States, and a resident of 141 Commerce street, Newark, county of Essex, State of New Jersey, have invented certain new and useful Improvements in Links for Permeable Chains, fully described and represented in the following specification and the accompanying drawings, forming a part of the same.

The object of the present invention is to furnish a means of uniting ordinary flat chain-links in the manufacture of a broad chain for supporting material under pressure. Such a chain must offer substantially a continuous bearing-surface for the material under pressure and when required must furnish an outlet for the fluid expressed from the material. Such a construction is secured by making the flat links with pivots farther apart than the width of the links, connecting the alternate links in the adjacent rows of the chain, and fitting separate space-blocks with concave sides between the ends of the links in all the rows.

The invention also comprises a particular construction for the chain and a drum to support the same whereby any fluid expressed from the material upon the chain may escape with the utmost freedom.

Figure 1:
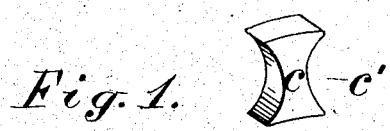
Figure 2:
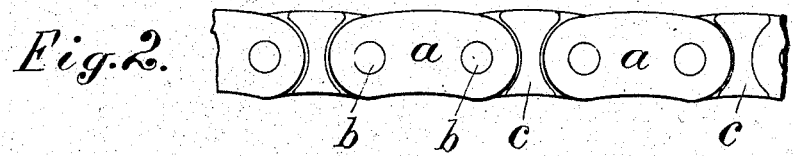
Figure 3:
Figure 4:
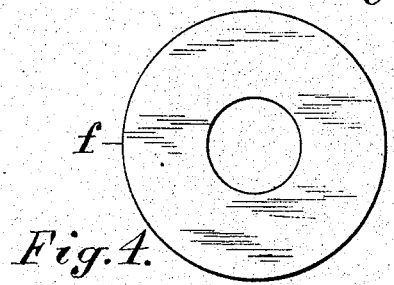

In the annexed drawings, Figure 1 is a perspective view of one of the space-blocks. Fig. 2 is a side elevation of a chain comprising the links and space-blocks. Fig. 3 is a plan of the chain containing eight rows of the links. Fig. 4 is a diagram of a pressing apparatus in side elevation, and Fig. 5 a side view of the same with the chain in section.

$a$ designates the link having semicircular ends and the centers of the rivet-holes $b$ farther apart than the width of the chain, so that when the alternate links in the adjacent rows are jointed together, as shown in Fig. 2, a space exists between the adjacent ends of the links in which space-blocks $c$ with concave sides $c'$ may be inserted to form a bearing-surface between the rounded ends of the links.

In an endless chain the links turn upon their joints when passing over the drum or pulley at the end loops; but the space-blocks are held in place by the fitting of the concave sides $c'$ against the ends of the links. Intermediate to the end pulleys or drums the links travel in an even line, and the links move but little in contact with the space-blocks.

It will be observed in Figs. 2 and 3 that the space-blocks supplement the outer sides of the links, so that the chain presents a substantially continuous bearing-surface, and any material pressed upon the chain is thus prevented from crowding between the ends of the links.

Figure 5:
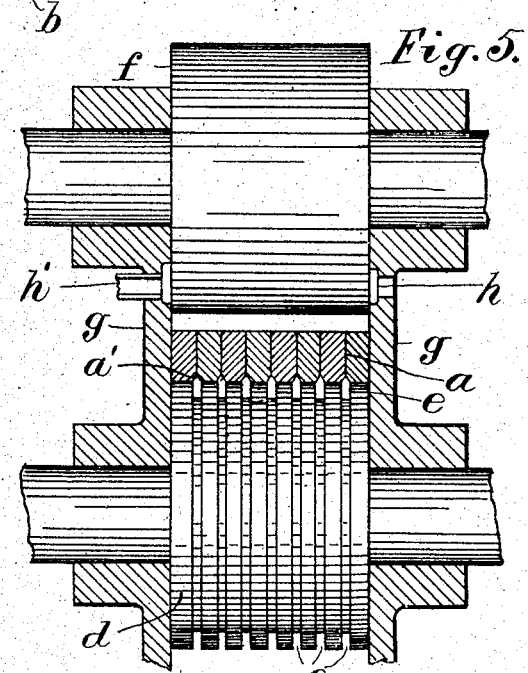

Figs. 4 and 5 show a supporting-drum $d$, having annular grooves $e$ beneath the contiguous edges of the rows of links and the edges $a'$ of the links beveled to the sides of the grooves.

In Fig. 5 cheeks $g$ are shown extended from the bearings of the roll upwardly past the edges of the chain to form a channel for the material to be pressed, and a pressing-roll $f$ is journaled in the cheeks adjacent to the chain to compress the material. The channel at the side of such pressing-roll is contracted gradually, and the juice is thus expressed gradually from the material and escapes downwardly through the links. Where the chain is closest to the roll and the maximum pressure is exerted, the fluid finds a ready escape through the grooves $e$ in the drum, and the pressed fiber which is discharged from the chain is thus prevented from reabsorbing any of the liquid.

It will be observed by reference to Figs. 2 and 3 that the outer side of the chain presents substantially a continuous bearing-surface for the material under pressure and that the flat links $a$ have semicircular ends and uniform thickness throughout, so that they may be readily made by casting, punching, and other processes of manufacture. The space-blocks are also readily made by casting, drop-forging, or punching from suitable metal, and the chain may thus be made uniform with great economy.

It will be readily understood that where the pressing-roll is arranged above the chain the juice which is expressed from the material will not only flow downward through the chain, but will also be forced upwardly past the ends of the roll where the same contacts with the cheeks of the housing. To prevent such juice from being absorbed by the fiber as it is discharged from the machine, which would result if the juice flows upon the fiber beyond the point of greatest compression, I form a channel or space contiguous to the end of the roll, either in the roll or the cheek, to receive the juice which is forced upwardly. Such channel or space is formed just above the lower side of the roll and is provided with an outlet to deliver the fluid from such channel. Fig. 5 shows such a channel or space $h$, formed in the cheek at the end of the roll and provided upon one side with an outlet $h'$, which permits the escape of the fluid. At the opposite side an outlet is shown unprovided with pipe, which construction would answer when provision is made to catch the juice which flows downwardly. Whether such outlets be furnished with pipes or not, the juice which flows into such channels may be collected and mingled with the juice which passes through the chains.

Having thus set forth the nature of the invention, what is claimed herein is—

1. In an extracting-machine, a chain comprising links having pivots farther apart than the width of the link, and space-blocks with concave sides interposed between the adjacent ends of the links.

2. A flat composite chain comprising rows of links of uniform thickness having the alternate links connected in the adjacent rows, and space-blocks with concave sides inserted between the ends of the links in all the rows.

3. A flat composite chain for a juice-extracting machine, comprising rows of links of uniform thickness in each row with the forward end of each link pivoted to the rear end of the link in the adjacent row, and loosely-fitted space-blocks inserted between the ends of the links in the rows to form a bearing-surface between the ends of the links.

4. A flat composite chain having parallel rows of links each beveled upon the inner corner to facilitate the discharge of juice passing between the links from the outer side.

5. In a juice-extracting machine, the combination, with a flat composite chain having rows of links as set forth, of a supporting-drum having annular grooves in coincidence with the longitudinal joints of the links to receive the juice discharged from the same.

6. In a juice-extracting machine having a chain and a pressing-roll fitted between cheeks forming a channel for the material, and the pressing-roll being arranged above the chain, the combination, with the pressing-roll and the cheeks fitted to its ends, of a channel contiguous to the end of the roll above its lower side and an outlet to deliver fluid from the channel, whereby the juice pressed upwardly between the cheeks may be received and collected.

7. In a juice-extracting machine having a chain and a pressing-roll fitted between cheeks forming a channel for the material, and the pressing-roll being arranged above the chain, the combination, with the pressing-roll and the cheeks fitted to its ends, of a channel formed in the cheeks contiguous to the ends of the roll near the lower part of the roll, and outlets from such channel through the cheeks with means for conducting the fluid therefrom, substantially as herein set forth.

In testimony whereof I have hereunto set my hand in the presence of two subscribing witnesses.

JOHN W. HYATT.

Witnesses:
 L. LEE,
 THOMAS S. CRANE.